(12) United States Patent
Bhattacharyya et al.

(10) Patent No.: US 9,307,541 B1
(45) Date of Patent: Apr. 5, 2016

(54) COUNTRY CODE SELECTION LOGIC FOR WI-FI STATIONS

(71) Applicant: QUALCOMM Incorporated, San Diego, CA (US)

(72) Inventors: Tushnim Bhattacharyya, San Diego, CA (US); Ashish Kumar Agrawal, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/616,154

(22) Filed: Feb. 6, 2015

(30) Foreign Application Priority Data

Sep. 30, 2014  (IN) .......................... 4910/CHE/2014

(51) Int. Cl.
| | |
|---|---|
| *H04W 4/00* | (2009.01) |
| *H04W 72/04* | (2009.01) |
| *H04W 52/28* | (2009.01) |
| *H04W 48/16* | (2009.01) |
| *H04W 48/20* | (2009.01) |
| *H04W 84/12* | (2009.01) |
| *H04W 8/00* | (2009.01) |
| *H04W 24/02* | (2009.01) |
| *H04W 48/18* | (2009.01) |

(52) U.S. Cl.
CPC ............ *H04W 72/048* (2013.01); *H04W 48/16* (2013.01); *H04W 48/20* (2013.01); *H04W 52/283* (2013.01); *H04W 84/12* (2013.01); *H04W 8/005* (2013.01); *H04W 24/02* (2013.01); *H04W 48/18* (2013.01)

(58) Field of Classification Search
CPC ..... H04W 48/16; H04W 84/12; H04W 28/18; H04W 84/18; H04W 48/20; H04W 48/18; H04W 48/10; H04W 76/021; H04W 8/005; H04W 24/02; H04W 8/18; H04W 8/183
USPC .................................. 370/338; 455/434, 450
See application file for complete search history.

(56) References Cited

U.S. PATENT DOCUMENTS

| | | | | |
|---|---|---|---|---|
| 7,650,428 | B1 * | 1/2010 | Taaghol | H04W 48/20 455/39 |
| 8,228,865 | B2 * | 7/2012 | Khandelwal | H04W 24/00 370/330 |
| 2004/0214539 | A1 * | 10/2004 | Rajamani | H04W 48/18 455/161.1 |
| 2005/0105501 | A1 * | 5/2005 | Oura | H04W 28/18 370/338 |
| 2006/0009219 | A1 * | 1/2006 | Jaakkola | H04B 1/406 455/435.2 |
| 2006/0213967 | A1 * | 9/2006 | Chuang | H04W 8/22 235/375 |
| 2007/0038776 | A1 | 2/2007 | Abhishek et al. | |
| 2009/0156206 | A1 * | 6/2009 | Rathonyi | H04W 48/16 455/434 |
| 2012/0076045 | A1 | 3/2012 | Pease et al. | |
| 2013/0235861 | A1 | 9/2013 | Balasubramanian et al. | |
| 2014/0050320 | A1 | 2/2014 | Choyi et al. | |

* cited by examiner

*Primary Examiner* — Olumide T Ajibade Akonai (74) *Attorney, Agent, or Firm* — Mahamedi Paradice LLP (57) ABSTRACT

A wireless station (STA) and a method are disclosed that allow the STA to determine suitable characteristics for wireless transmissions from the STA. The STA may receive frames from a number of access points (APs), each frame including a country code indicating a country in which the corresponding AP is located, determine a popularity of each country code by polling the received country codes, determine in which country the STA is currently located based, at least in part, on the determined popularities of the country codes, and select a wireless channel and a transmit power level based, at least in part, on the determined country.

23 Claims, 5 Drawing Sheets

COUNTRY CODE SELECTION LOGIC FOR WI-FI STATIONS

CROSS REFERENCE TO RELATED APPLICATIONS

This application claims priority under 35 U.S.C. 119(b) to co-pending and commonly owned Indian Patent Application No. 4940/CHE/2014 entitled "COUNTRY CODE SELECTION LOGIC FOR WI-FI STATIONS" filed on Sep. 30, 2014, the entirety of which is incorporated by reference herein.

TECHNICAL FIELD

The example embodiments relate generally to wireless networks, and specifically to determining correct country code information broadcast from one or more access points.

BACKGROUND OF RELATED ART

A wireless local area network (WLAN) may be formed by one or more access points (APs) that provide a wireless communication channel or link with a number of client devices or stations (STAs). Each AP, which may correspond to a Basic Service Set (BSS), periodically broadcasts beacon frames to enable any STAs within wireless range of the AP to establish and/or maintain a communication link with the WLAN (also known as the Wi-Fi network). The beacon frames, which may include a traffic indication map (TIM) and/or a delivery traffic indication message (DTIM) indicating whether the AP has queued downlink data for the STAs, are typically broadcast according to a target beacon transmission time (TBTT) schedule.

The IEEE 802.11d standards allow an AP to include an Information Element (IE) in the beacon frames that includes country code information of the AP. The country code information may include a country code indicating a country, region, or domain where the AP is located, and may also include a list of authorized channels, transmit power levels, and other restrictions (e.g., imposed by a government or regulatory agency). For example, countries typically apply their own regulations to both the authorized channels, allowed users, and maximum power levels for various wireless frequency ranges. These regulations may vary between countries. For example, while Japan may currently allow Wi-Fi devices to operate on a particular channel, the United States may currently not allow Wi-Fi devices to operate on the particular channel. A station (STA) receiving these beacon frames may extract the country code information to determine in which country or domain the AP is located, and then use only those acceptable channels and corresponding transmit power levels associated with that country.

Thus, for a STA to comply with such regulations, the country code information provided in the beacon frames must be accurate. Unfortunately, when a particular AP is malfunctioning or is being maliciously operated (hereinafter referred to as a "rogue" AP), the AP may provide incorrect country code information to the STA, which in turn may cause the STA to run afoul of regulations specified by the country in which the STA is currently located (e.g., by transmitting on channels that are not authorized by the country and/or by transmitting at power levels greater than the power limits allowed by the country).

In addition, when the STA is near a border between two countries, the STA may receive beacon frames from groups of APs that are located in different countries, where a first group of APs may broadcast country code information pertaining to a first country and a second group of APs may broadcast country code information pertaining to a second country. In this situation, it is desirable for the STA to select the correct country code information broadcast from the different groups of APs so that the STA complies with regulations imposed by the country in which the STA is located.

BRIEF DESCRIPTION OF THE DRAWINGS

The example embodiments are illustrated by way of example and are not intended to be limited by the figures of the accompanying drawings, where like reference numerals refer to corresponding parts throughout the drawing figures.

DETAILED DESCRIPTION

The example embodiments are described below in the context of data exchanges between Wi-Fi enabled devices for simplicity only. It is to be understood that the example embodiments are equally applicable to data exchanges using signals of other various wireless standards or protocols. As used herein, the terms "WLAN" and "Wi-Fi" can include communications governed by the IEEE 802.11 family of standards, Bluetooth, HiperLAN (a set of wireless standards, comparable to the IEEE 802.11 standards, used primarily in Europe), and other technologies having relatively short radio propagation range. Thus, the terms "WLAN" and "Wi-Fi" may be used interchangeably herein. In addition, the example embodiments may be implemented in wireless networks configured to operate as infrastructure WLAN systems, peer-to-peer (or Independent Basic Service Set) wireless systems, Wi-Fi Direct wireless systems, and/or Hotspots. Thus, the term "AP" may include access points, soft APs, group owners (GOs), and any other device that manages and/or controls access to and/or the operation of a wireless network.

In addition, although described herein in terms of exchanging data packets between wireless devices, the example embodiments may be applied to the exchange of any data unit, packet, and/or frame between wireless devices. Thus, the term "data packet" may include any frame, packet, or data unit such as, for example, protocol data units (PDUs), MAC protocol data units (MPDUs), and physical layer convergence procedure protocol data units (PPDUs). The term "A-MPDU" may refer to aggregated MPDUs.

Further, as used herein, a "country code" may indicate a country, region, or domain where a corresponding AP is located. Thus, the terms country, region, and domain may be used interchangeably herein, and generally refer to a geographic area having one or more associated attributes such as allowed Wi-Fi channels (e.g., frequency bands), maximum transmit power levels, and other regulations or restrictions imposed upon APs and/or STAs operating within the corresponding geographic region.

In the following description, numerous specific details are set forth such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the example embodiments. However, it will be apparent to one skilled in the art that these specific details may not be required to practice the example embodiments. In other instances, well-known circuits and devices are shown in block diagram form to avoid obscuring the present disclosure. The example embodiments are not to be construed as limited to specific examples described herein but rather to include within their scopes all embodiments defined by the appended claims.

Figure 1:
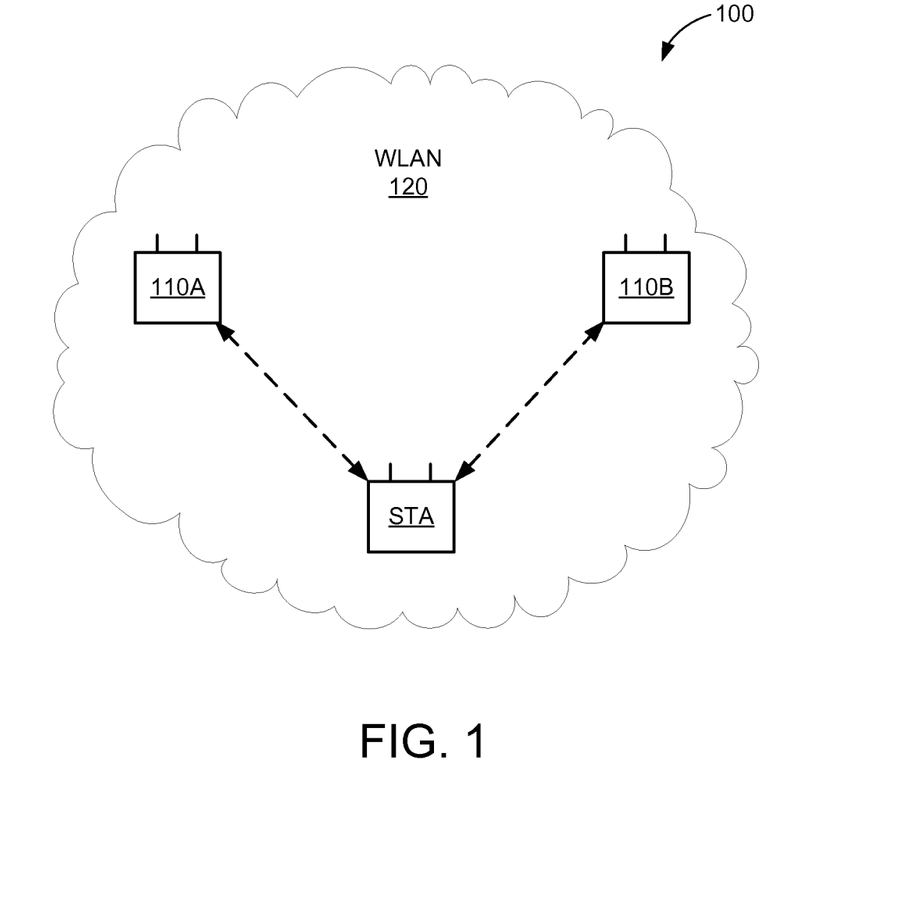
FIG. 1 shows a block diagram of a WLAN system within which the example embodiments may be implemented.

FIG. 1 shows a block diagram of an example wireless system 100 within which the example embodiments may be implemented. The wireless system 100 is shown to include a wireless station STA, two wireless access points (APs) 110A-110B, and a wireless local area network (WLAN) 120. The WLAN 120 may be formed by any number of APs that may operate according to the IEEE 802.11 family of standards (or according to other suitable wireless protocols). Thus, although only two APs 110A-110B are shown in FIG. 1 for simplicity, it is to be understood that WLAN 120 may be formed by any number of APs. Each of APs 110A-110B is assigned a unique MAC address that is programmed therein by, for example, the manufacturer of the AP. Similarly, the STA is also assigned a unique MAC address.

The station STA may be any suitable Wi-Fi enabled wireless device including, for example, a cell phone, personal digital assistant (PDA), tablet device, laptop computer, or the like. The station STA may also be referred to as a user equipment (UE), a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. For at least some embodiments, the station STA may include one or more transceivers, one or more processing resources (e.g., processors and/or ASICs), one or more memory resources, and a power source (e.g., a battery). The memory resources may include a non-transitory computer-readable medium (e.g., one or more nonvolatile memory elements, such as EPROM, EEPROM, Flash memory, a hard drive, etc.) that stores instructions for performing operations described below with respect to FIG. 5.

The APs 110A-110B may be any suitable device that allows one or more wireless devices to connect to a network (e.g., a local area network (LAN), wide area network (WAN), metropolitan area network (MAN), and/or the Internet) via AP 110 using Wi-Fi, Bluetooth, or any other suitable wireless communication standards. For at least one embodiment, each of APs 110A-110B may include one or more transceivers, a network interface, one or more processing resources, and one or more memory resources. The memory resources may include a non-transitory computer-readable medium (e.g., one or more nonvolatile memory elements, such as EPROM, EEPROM, Flash memory, a hard drive, etc.) that store instructions for performing operations described below with respect to FIG. 5.

Figure 2:
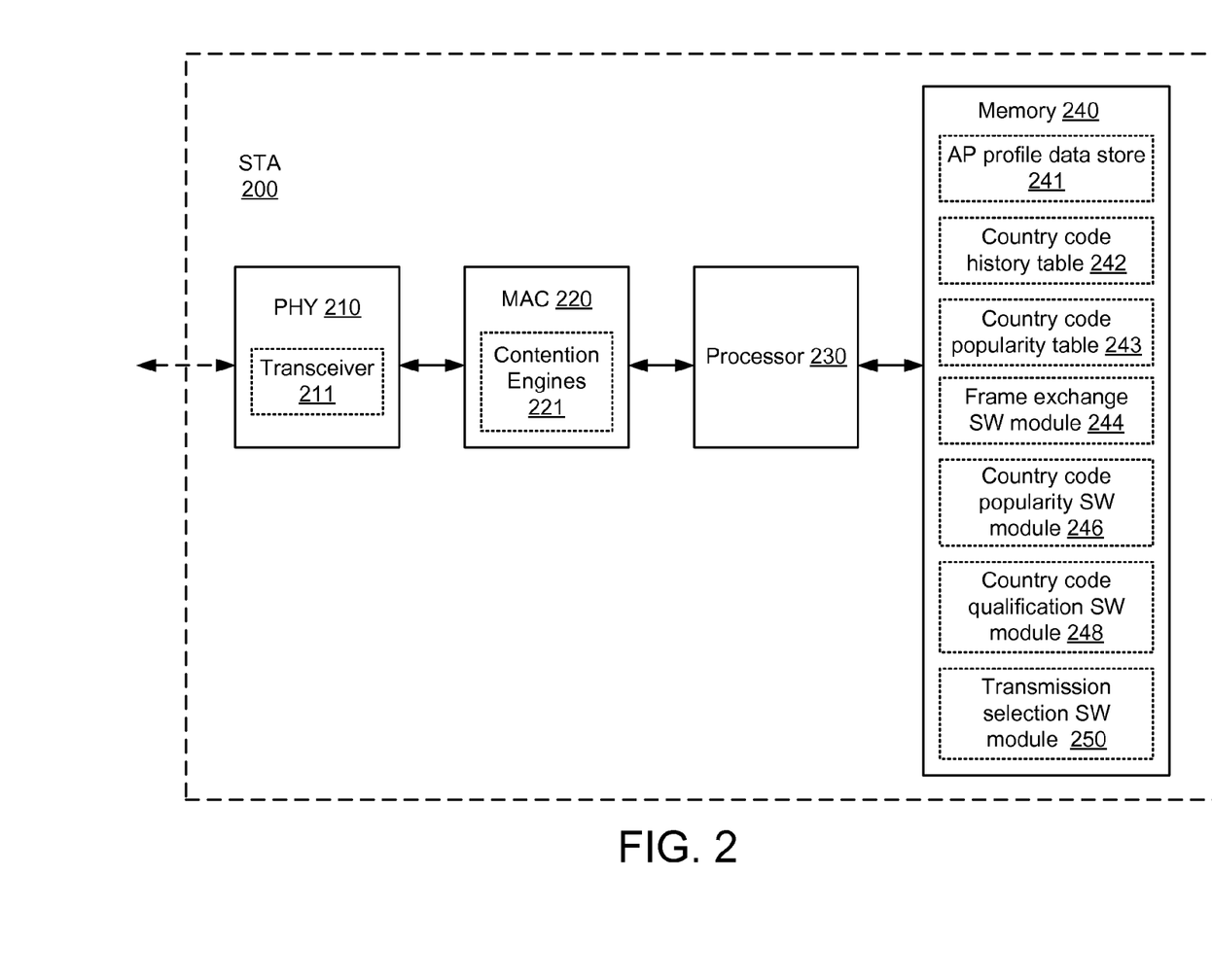
FIG. 2 shows a block diagram of a wireless station (STA) in accordance with example embodiments.

FIG. 2 shows a block diagram of a wireless STA 200 in accordance with some embodiments. Specifically, the STA 200 may be one embodiment of the station STA of FIG. 1. The STA 200 may include a PHY device 210 including at least a WLAN transceiver 211, a MAC device 220 including a number of contention engines 221, a processor 230, and a memory 240. The transceiver 211 may be used to transmit signals to and receive signals from an AP (e.g., APs 110A-110B) and/or other STAs, and to scan the surrounding environment to detect and identify nearby APs (e.g., APs within range of STA 200) and/or nearby STAs. More specifically, the transceiver 211 may be used to perform active and/or passive scanning operations to request and/or receive country code information from nearby APs. For purposes of discussion herein, MAC device 220 is shown in FIG. 2 as being coupled between PHY device 210 and processor 230. For actual embodiments, PHY device 210, MAC device 220, processor 230, and/or memory 240 may be connected together using one or more buses (not shown for simplicity).

The contention engines 221 may contend for access to a shared wireless communications medium, and may also store packets for transmission over the shared medium. The STA 200 may include one or more contention engines 221 for each of a plurality of different ACs (not shown in FIG. 2 for simplicity). For other embodiments, the contention engines 221 may be separate from MAC device 220. Still further, for some embodiments, the contention engines 221 may be implemented as one or more software modules (e.g., stored in memory 240 or stored in memory provided within MAC device 220) containing instructions that, when executed by processor 230, perform the functions of contention engines 221.

Memory 240 may include an AP profile data store 241 that stores profile information for a plurality of APs. The profile information for a particular AP may include information including, for example, the AP's service set ID (SSID), channel information, country code information, received signal strength indicator (RSSI) values, supported data rates, connection history with STA 200, a trustworthiness value of the AP (e.g., indicating a level of confidence about the AP's location, broadcast country code information, etc.), and any other suitable information pertaining to or describing the operation of the AP.

Memory 240 may also include a country code history table 242 and a country code popularity table 243. The country code history table 242 may store country codes, authorized channel lists, and/or maximum transmit power levels previously received from each of a number of APs (e.g., during a previous time period, which may be dynamically configurable). The country code popularity table 243 may store a popularity value for each of a number of received country codes. The popularity values may be used to determine which country the STA 200 is currently operating in, and to therefore select the correct list of authorized channels and transmit power levels.

Figure 5:
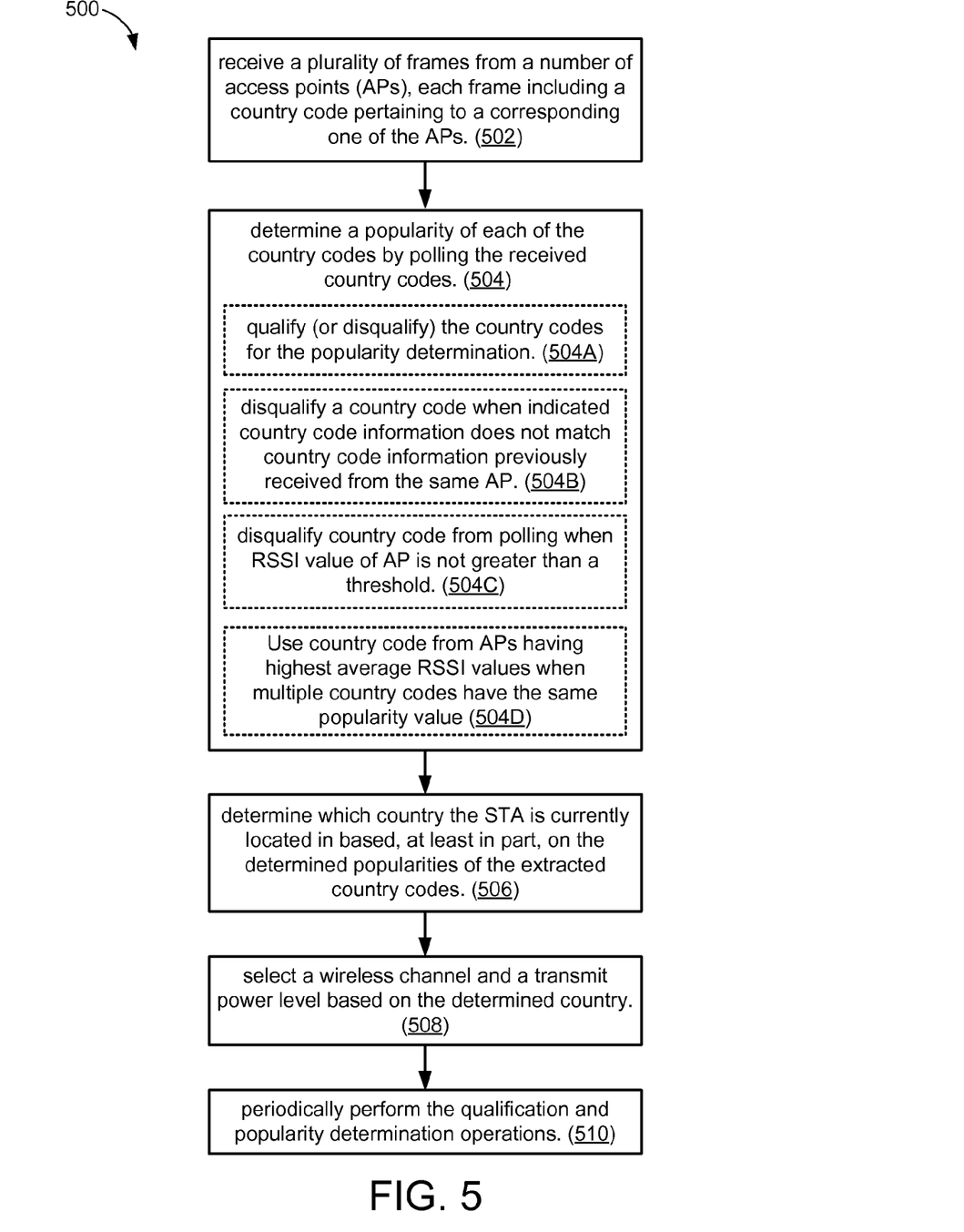
FIG. 5 is an illustrative flow chart depicting an example operation of the STA of FIG. 4 qualifying received country code information and selecting the correct country based at least in part on the qualified country code information.

Memory 240 may also include a non-transitory computer-readable medium (e.g., one or more nonvolatile memory elements, such as EPROM, EEPROM, Flash memory, a hard drive, and so on) that can store the following software modules:

a frame exchange software module 244 to facilitate the creation and exchange of frames (e.g., association requests, probe requests, data frames, acknowledgement (ACK) frames, management frames, action frames, control frames, and so on) between the STA 200 and other STAs and/or a number of APs (e.g., as described for the operations of FIG. 5);

a country code popularity software module 246 to determine a popularity of the country codes received from a number of APs, for example, by polling received country code information to determine occurrence values during a selected period of time (e.g., as described for the operations of FIG. 5);

a country code qualification software module 248 to qualify the received country code information for polling by the country code popularity software module 246 (e.g., as described for the operations of FIG. 5); and a transmission selection software module 250 to select Wi-Fi channels and transmit power levels suitable for the country in which the STA 200 is determined to be located (e.g., as described for the operations of FIG. 5).

Each software module includes program instructions that, when executed by processor 230, cause STA 200 to perform the corresponding functions. The non-transitory computer-readable medium of memory 240 thus includes instructions for performing all or a portion of the operations described below with respect to FIG. 5.

Processor 230, which is shown in the example of FIG. 2 as coupled to PHY device 210 and transceiver 211, to MAC device 220 and contention engines 221, and to memory 240, may be any suitable one or more processors capable of executing scripts or instructions of one or more software programs stored in STA 200 (e.g., within memory 240). For example, processor 230 may execute the frame exchange software module 244 to facilitate the creation and exchange of frames (e.g., association requests, probe requests, data frames, acknowledgement (ACK) frames, management frames, action frames, control frames, and so on) between the STA 200 and other STAs and/or a number of APs. Processor 230 may also execute the country code popularity software module 246 to determine a popularity value for each of the country codes received from a number of APs, for example, by polling the received country codes to determine how many times the same country code is received by the STA 200 during a selected time period. Processor 230 may also execute the country code qualification software module 248 to qualify the received country code information for polling by the country code popularity software module 246. Processor 230 may also execute the transmission selection software module 250 to select Wi-Fi channels and transmit power levels suitable for the country in which the STA 200 is determined to be located.

Figure 3:
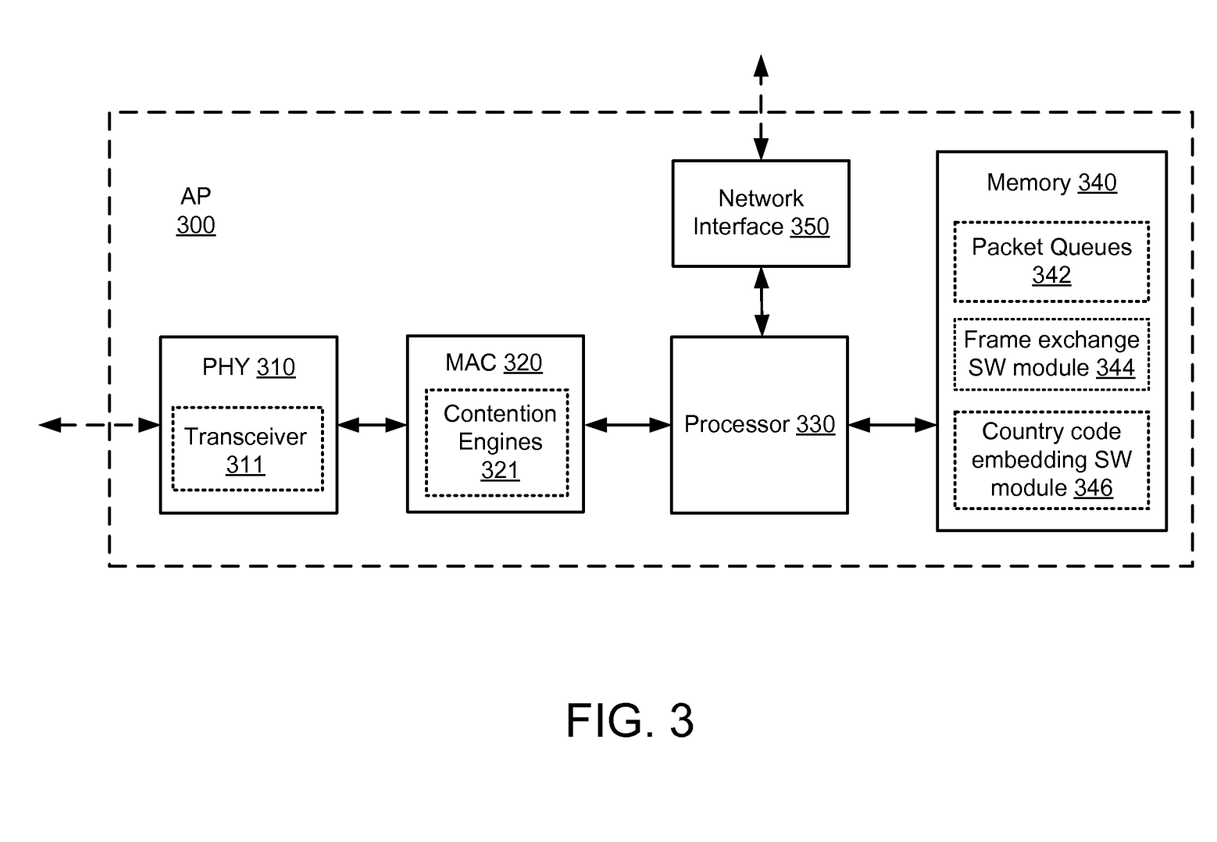
FIG. 3 shows a block diagram of a wireless access point (AP) in accordance with example embodiments.

FIG. 3 shows an example of an AP 300 that is one embodiment of APs 110A-110B of FIG. 1. AP 300 includes a PHY device 310 including at least a transceiver 311, a MAC device 320 including at least a number of contention engines 321, a processor 330, a memory 340, and a network interface 350. The transceiver 311 may be used to communicate wirelessly with one or more STAs, with one or more other APs, and/or with other suitable devices. The network interface 350 may be used to communicate with a WLAN server (not shown for simplicity) associated with WLAN 120 of FIG. 1 either directly or via one or more intervening networks and to transmit signals. Processor 330, which is coupled to PHY device 310 and transceiver 311, to MAC device 320 and contention engines 321, to memory 340, and to network interface 350, may be any suitable processor capable of executing scripts or instructions of one or more software programs stored in AP 300 (e.g., within memory 340). For purposes of discussion herein, MAC device 320 is shown in FIG. 3 as being coupled between PHY device 310 and processor 330. For actual embodiments, PHY device 310, MAC device 320, processor 330, memory 340, and/or network interface 350 may be connected together using one or more buses (not shown for simplicity).

The contention engines 321 may contend for access to the shared wireless medium, and may also store packets for transmission over the shared wireless medium. For some embodiments, AP 300 may include one or more contention engines 321 for each of the plurality of different access categories. For other embodiments, the contention engines 321 may be separate from MAC device 320. For still other embodiments, the contention engines 321 may be implemented as one or more software modules (e.g., stored in memory 340 or within memory provided within MAC device 320) containing instructions that, when executed by processor 330, perform the functions of contention engines 321.

Memory 340 may include a number of packet queues 342. The packet queues 342 may store packets to be transmitted from AP 300 to one or more STAs. For some embodiments, the memory 340 may include one or more packet queues 342 for each of a plurality of different priority levels or access categories. In addition, for at least some embodiments, memory 340 may include packet queues for a plurality of different destinations (e.g., STAs).

Memory 340 may also include a non-transitory computer-readable medium (e.g., one or more nonvolatile memory elements, such as EPROM, EEPROM, Flash memory, a hard drive, and so on) that can store the following software modules:

a frame exchange software module 344 to facilitate the creation and exchange of frames (e.g., association responses, probe responses, beacon frames, data frames, acknowledgement (ACK) frames, management frames, action frames, control frames, and so on) between the AP 300 and nearby STAs; and a country code embedding software module 346 to embed country code information within beacon frames, probe responses, action frames, and/or any other suitable frames. The country code information may include a country code, a list of authorized channels for the corresponding country, and/or maximum allowable transmit power levels for the authorized channels.

Each software module includes instructions that, when executed by processor 330, cause AP 300 to perform the corresponding functions. The non-transitory computer-readable medium of memory 340 thus includes instructions for performing all or a portion of the AP-side operations of the methods of FIG. 5.

Processor 330, which is shown in the example of FIG. 3 as coupled to transceiver 311 of PHY device 310 via MAC device 320, to memory 340, and to network interface 350, may be any suitable processor capable of executing scripts or instructions of one or more software programs stored in AP 300 (e.g., within memory 340). For example, processor 330 may execute the frame exchange software module 344 to facilitate the creation and exchange of frames (e.g., association responses, probe responses, beacon frames, data frames, acknowledgement (ACK) frames, management frames, action frames, control frames, and so on) between the AP 300 and nearby STAs. Processor 330 may also execute the country code embedding software module 346 to embed country code information within beacon frames, probe responses, action frames, and/or any other suitable frames.

Figure 4:
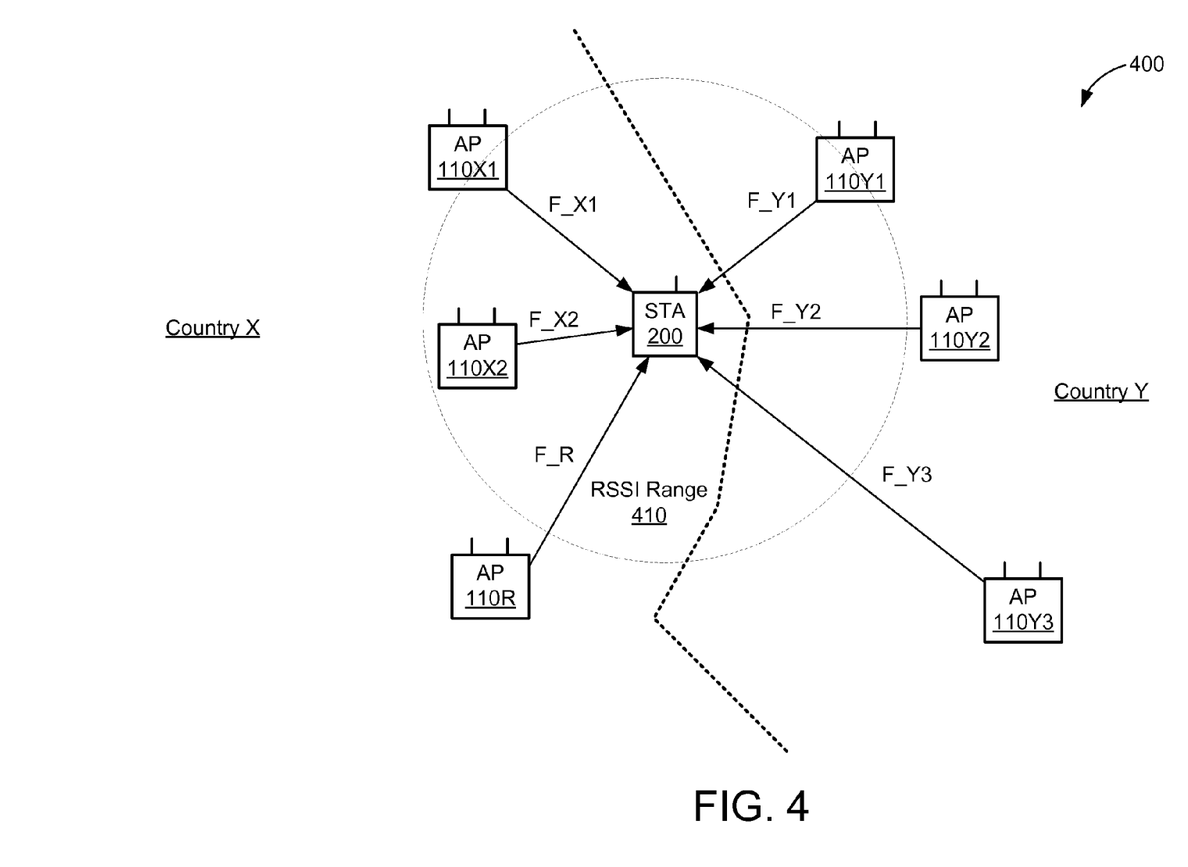
FIG. 4 depicts a STA within wireless range of a plurality of APs that are located in different countries.

FIG. 4 is a diagram 400 illustrating the STA 200 of FIG. 2 in the vicinity of six APs 110X1-110X2, 110Y1-110Y3, and 110R (each of which may be an embodiment of AP 300 of FIG. 3). The STA 200 is depicted in FIG. 4 as being currently located in country X. APs 110X1-110X2 and AP 110R are located in country X, and APs 110Y1-110Y3 are located in country Y. For purposes of discussion herein, AP 110R is considered to be a "rogue" AP. Thus, AP 110R may be including incorrect country code information in its beacon frames, probe responses, and/or action frames. As used herein, incorrect country code information may mean that AP 110R is broadcasting an incorrect country code (e.g., a country code that does not correspond to country X, is broadcasting an incorrect list of authorized channels for country X, and/or is broadcasting incorrect transmit power levels for channels authorized by country X).

The STA 200 receives frames F_X1-F_X2 from respective APs 110X1-110X2, receives frames F_Y1-F_Y3 from respective APs 110Y1-110Y3, and receives frames F_R from AP 110R. The frames may be beacon frames broadcast by the APs (e.g., at target beacon transmission times (TBTTs)) and received by the STA 200 during passive scanning operations, or may be probe responses transmitted in response to probe requests broadcast by the STA 200 during active scanning operations. For other embodiments, the frames may be action frames or other suitable frames transmitted from the APs to the STA 200.

The STA 200 extracts the country code information from the received frames, and may first qualify of each the received country codes for consideration in a subsequent polling or voting operation to determine a popularity of each of the received country codes. The qualification operation may involve two steps. Although these two steps are described below as sequential steps performed in a given manner, the two steps may be performed concurrently or in a different order.

The first qualification step may qualify (or disqualify) the received country code information (1) based on a comparison between the received country code and one or more country codes previously received from the same AP (e.g., as stored in country code history table 242) and/or (2) based on a comparison between the received country code and a list of valid channels advertised by the AP. More specifically, if there is a match for conditions (1) and (2), then the STA 200 may qualify the received country code information for consideration in the subsequent polling operation. Conversely, if there is a mismatch for either of conditions (1) and (2), then the STA 200 may disqualify the received country code information for consideration in the subsequent popularity determination (e.g., polling operation).

For one example, suppose that although AP 110R is located in country X, the country code broadcast by AP 110R indicates country Z. The STA 200 may compare the country code broadcast from AP 110R with country codes previously received from AP 110R and/or with a known country code associated with AP 110R (e.g., using country code qualification software module 248 and country code history table 242 of FIG. 2) to determine if there is a mismatch. For this example, there is a mismatch between the country code just received from AP 110R and either (1) country codes previously received from AP 110R or (2) a known country code for AP 110R; in response thereto, the STA 200 may disqualify the country code information received from AP 110R.

For another example, suppose that AP 110R includes the correct country code (e.g., indicating country X), but advertises (e.g., in the frame received by the STA 200) an incorrect list of authorized channels and/or transmit power levels for country X. For this example, the STA 200 may compare the list of authorized channels and/or transmit power levels advertised by AP 110R with stored information indicating the correct list of authorized channels and/or transmit power levels for country X (e.g., using country code qualification software module 248). The stored information may be previously stored in the STA 200, or may be provided to STA 200 via a cellular or Wi-Fi connection (or any other suitable connection). If the STA 200 determines that the list of authorized channels or transmit power levels is inconsistent with the stored information, then the STA 200 may disqualify the country code information received from AP 110R.

The second qualification step may qualify (or disqualify) the received country code information based on RSSI values of the received frames. More specifically, if the RSSI value of a received frame is greater than (or equal to) a threshold value (e.g., indicating that the corresponding AP may be relatively close to the STA 200), then the STA 200 may qualify the received country code information for consideration in the subsequent popularity determination (e.g., polling operation) (e.g., if not disqualified during the first qualification step). Conversely, if the RSSI value of the received frame is less than the threshold value (e.g., indicating that the corresponding AP may be relatively far from the STA 200), then the STA 200 may disqualify the received country code information for consideration in the subsequent popularity determination (e.g., polling operation).

For example, referring again to FIG. 4, a first group of APs 110X1-110X2 may broadcast country codes for country X, while a second group of APs 110Y1-110Y3 may broadcast country codes for country Y. For some embodiments, the STA 200 may qualify country code information provided by APs having an RSSI value that is greater than a threshold level, and may disqualify country code information provided by APs having an RSSI value that is not greater than the threshold level. For the example of FIG. 4, the STA 200 is depicted as having an RSSI threshold level corresponding to geographical RSSI range 410. More specifically, the RSSI range 410 of FIG. 4 is shown to include APs 110X1, 110X2, and 110Y1. Thus, because the RSSI values for APs 110X1, 110X2, and 110Y1 are greater than the RSSI threshold level (e.g., as indicated by their inclusion in geographical RSSI range 410), country codes provided by APs 110X1, 110X2, and 110Y1 may be qualified for the popularity determination. Conversely, the RSSI range 410 of FIG. 4 is shown to not include APs 110Y2, 110Y3, and 110R. Thus, because the RSSI values for APs 110Y2, 110Y3, and 110R are not greater than the RSSI threshold level (e.g., as indicated by their exclusion from geographical RSSI range 410), country codes provided by APs 110Y2, 110Y3, and 110R may be disqualified from the subsequent popularity determination (e.g., polling operation).

The STA 200 may then determine which of the country codes is the most popular based on the qualified country codes (e.g., which of the qualified country codes is received the most number of times during a selected time period). For the example of FIG. 4, the STA 200 may count the number of times that country codes are received from the "qualified" APs 110X1, 110X2, and 110Y1 during the selected time period, and then determine that the most popular country code is likely to be the correct country code (e.g., the country code corresponding to the country in which the STA is located). For purposes of discussion herein, the number of received country codes indicating country X is greater than the number of country codes indicating country Y, and therefore the country code indicating country X is determined to be the most popular. In other words, for a respective country code, the STA 200 may increment a count value for the respective country code each time a frame containing the respective country code is received and qualifies for the popularity determination, and the STA 200 may ignore the respective country code when the respective country code does not qualify for the popularity determination.

For some embodiments, the STA 200 may use a number of counters (not shown for simplicity) each for maintaining a count of the number of corresponding country codes received during the selected time period, and may use compare logic to determine which of the country codes was received the most times during the selected time period. The selected time period may be any suitable time period. For at least one embodiment, selected time period may be configurable or otherwise selectable (e.g., by a user of STA 200, by a manufacturer of STA 200, or by an operator of a wireless service used by STA 200).

For this example, the STA 200 determines that it is located in country X, and then operates using a list of channels and transmit power levels authorized by country X. Thereafter, the STA 200 may maintain the channel list and transmit power levels of country X, and may then periodically perform the qualification and popularity determination operations to ensure that the STA 200 remains in compliance with channels and transmit power levels authorized by the country within which the STA is located. In this manner, if the STA 200 later crosses the border into country Y, then the STA 200 may update its channel list and transmit power levels to be consistent with regulations imposed by country Y (e.g., in response to determining that the number of qualified country codes indicating country Y is greater than the number of qualified country codes indicating country X). The period of time between periodically performing the qualification and popularity determination operations may be predetermined or dynamically configurable; for some embodiments, the period of time may range from as little as a few seconds to as much as several minutes (or more). Further, if the STA 200 does not receive any additional country code information for a given time period, then the STA 200 may maintain the current country code settings until subsequent country code information is received (e.g., from subsequent beacon frames) and is deemed to warrant another qualification and popularity determination operation.

If there is a tie in the popularity determination (e.g., if two or more received country codes have the same determined popularity), then the STA 200 may select the country code broadcast from the AP(s) having the highest average RSSI values (and that was not disqualified from the popularity polling operations). For example, if the number of frames including a first country code indicating country X is the same as the number of frames including a second country code indicating country Y, then the STA 200 may determine whether the group of APs 110X1-1110X2 or the group of APs 110Y1-110Y3 has the highest average RSSI value, and then select the most popular country code accordingly.

FIG. 5 shows an example operation 500 of a method for station 200 to determine suitable transmission characteristics in accordance with the example embodiments. First, the STA 200 receives a plurality of frames from a number of access points (APs), each frame including country code information containing at least a country code indicating in which country the AP is located (502). The country code information may also include a list authorized channels and/or allowable transmit power levels for the corresponding country. The STA 200 may extract the country code information from the received frames. Next, the STA 200 determines a popularity of each of a number of different country codes by polling the received country codes (504). As described above, the polling operation may determine a number of times that the same country code is received (e.g., from one or more APs) during a selected time period. For some embodiments, the polling operation may be implemented using a voting mechanism.

For some embodiments, the STA 200 may qualify (or disqualify) the country codes for the popularity determination (504A). The STA 200 may disqualify a country code when the country code information most recently received from an AP does not match country code information previously received from the same AP (504B). Conversely, the STA 200 may qualify the country code when the most recently received country code information matches previously received country code information from the same AP. For one example, for each of the received country codes, the STA 200 may compare the country code received from a corresponding AP with one or more country codes previously received from the same AP, and qualify the received country code when the comparison results in a match; otherwise, when there is a mismatch, the STA 200 may disqualify the received country code (e.g., because the recent country code is inconsistent with its historical and/or known country code indications). For another example, for each of the received country codes, the STA 200 may compare a list of authorized channels received from a corresponding AP with known authorized channels for the corresponding country, and qualify the received country code when the comparison results in a match; otherwise, if there is a mismatch, the STA 200 may disqualify the received country code (e.g., because the advertised list of authorized channels is inconsistent with its historical and/or known list of authorized channels).

The STA 200 may disqualify a country code from the polling operation when the RSSI value of an AP is not greater than a threshold RSSI level (e.g., which may indicate that the AP is not relatively close to the STA 200 and thus may not be in the same country as the STA) (504C). Conversely, when the RSSI is greater than the threshold value (e.g., which may indicate that the AP is relatively close to the STA 200 and thus may be in the same country as the STA), then the STA 200 may qualify the country code. For example, for each of the received country codes, the STA 200 may determine a received signal strength indicator (RSSI) value for a corresponding AP, and qualify the received country code when the RSSI value is greater than a threshold level; otherwise, the STA 200 may disqualify the received country code when the RSSI value is not greater than the threshold level.

If there is a tie in the popularity determination (e.g., if a plurality of different country codes are received the same number of times during the selected time period), then the STA 200 may select the country code corresponding to the group of APs having the highest average RSSI values (504D). For example, when a first country code and a second country code have the same determined popularity, the STA 200 may determine an average RSSI value for one or more first APs associated with the first country code and determine an average RSSI value for one or more second APs associated with the second country code. Then, the STA 200 may select the first country code as the most popular country code when the average RSSI value of the one or more first APs is higher than the average RSSI value of the one or more second APs, and may select the second country code as the most popular country code when the average RSSI value of the one or more second APs is higher than the average RSSI value of the one or more first APs.

Next, the STA 200 determines in which country the STA 200 is currently located based, at least in part, on the determined popularities of the received (and qualified) country codes (506). Once the correct country code is determined, the STA 200 may then determine the list of authorized channels and acceptable transmit power levels for the corresponding country. Then, the STA 200 selects a wireless channel and a transmit power level based on the determined country (508).

Thereafter, the STA 200 may maintain the list of authorized channels and acceptable transmit power levels for the corresponding country, and may periodically perform the qualification and popularity determination operations to ensure that the STA 200 remains in compliance with channels and transmit power levels authorized by the country within which the STA 200 is located (510). In this manner, if the STA 200 later crosses the border into another country, then the STA 200 may update its channel list and transmit power levels to be consistent with regulations imposed by the other country.

At least one embodiment may include a non-transitory computer-readable medium containing program instructions that, when executed by a processor of a wireless station (STA) to determine suitable characteristics for wireless transmissions from the STA, cause the STA to perform operations comprising: determine a popularity of each country code by polling the received country codes; determine in which country the STA is currently located based, at least in part, on the determined popularities of the country codes; and select a wireless channel and a transmit power level based on the determined country. Execution of the instructions may cause the STA to qualify each of the received country codes for the popularity determination. Execution of the instructions may also cause the STA to, for a respective country code, increment a count value for the respective country code each time a frame containing the respective country code is received and qualifies for the popularity determination; and ignore the respective country code when the respective country code does not qualify for the popularity determination.

Execution of the instructions to qualify each of the received country codes may cause the STA to determine a received signal strength indicator (RSSI) value for a corresponding AP; qualify the received country code when the RSSI value is greater than a threshold level; and disqualify the received country code when the RSSI value is not greater than the threshold level.

Execution of the instructions to qualify each of the received country codes may cause the STA to compare the country code received from a corresponding AP with one or more country codes previously received from the same AP; qualify the received country code when the comparing results in a match; and disqualify the received country code when the comparing results in a mismatch.

Execution of the instructions to qualify each of the received country codes may cause the STA to compare a list of authorized channels received from a corresponding AP with known authorized channels for the corresponding country; qualify the received country code when the comparing results in a match; and disqualify the received country code when the comparing results in a mismatch.

Execution of the instructions may cause the STA to determine when a first country code and a second country code have the same determined popularity; determine an average received signal strength indicator (RSSI) value for a first group of APs associated with the first country code; determine an average RSSI value for a second group of APs associated with the second country code; select the first country code as the most popular country code when the average RSSI value of the first group of APs is higher than the average RSSI value of the second group of APs; and select the second country code as the most popular country code when the average RSSI value of the second group of APs is higher than the average RSSI value of the first group of APs.

In the foregoing specification, the example embodiments have been described with reference to specific exemplary embodiments thereof. It will, however, be evident that various modifications and changes may be made thereto without departing from the broader scope of the disclosure as set forth in the appended claims. The specification and drawings are, accordingly, to be regarded in an illustrative sense rather than a restrictive sense.

What is claimed is:

1. A method for a wireless station (STA) to determine transmission characteristics, the method comprising:
   receiving a plurality of frames from a number of access points (APs), each frame including a country code indicating a country in which the corresponding AP is located;
   determining a popularity of each country code by polling the received country codes;
   determining in which country the STA is currently located based, at least in part, on the determined popularities of the country codes; and
   selecting a wireless channel and a transmit power level based, at least in part, on the determined country.

2. The method of claim 1, wherein the frames includes at least one member of the group consisting of beacon frames, probe responses, and action frames.

3. The method of claim 1, further comprising:
   qualifying each of the received country codes for the popularity determination.

4. The method of claim 3, further comprising:
   periodically repeating the popularity determination and the qualification operations for each of the received country codes every M milliseconds, wherein M is an integer that is configurable by a user of the STA.

5. The method of claim 3, further comprising:
   for a respective country code,
      incrementing a count value for the respective country code each time a frame containing the respective country code is received and qualifies for the popularity determination; and
      ignoring the respective country code when the respective country code does not qualify for the popularity determination.

6. The method of claim 3, wherein the qualifying comprises:
   for each of the received country codes,
      determining a received signal strength indicator (RSSI) value for a corresponding AP;
      qualifying the received country code when the RSSI value is greater than a threshold level; and
      disqualifying the received country code when the RSSI value is not greater than the threshold level.

7. The method of claim 3, wherein the qualifying comprises:
   for each of the received country codes,
      comparing the country code received from a corresponding AP with one or more country codes previously received from the same AP;
      qualifying the received country code when the comparing results in a match; and
      disqualifying the received country code when the comparing results in a mismatch.

8. The method of claim 3, wherein the qualifying comprises:
   for each of the received country codes,
      comparing a list of authorized channels received from a corresponding AP with known authorized channels for the country indicated by the received country code;
      qualifying the received country code when the comparing results in a match; and
      disqualifying the received country code when the comparing results in a mismatch.

9. The method of claim 1, further comprising:
   when a first country code and a second country code have the same determined popularity, determining an average received signal strength indicator (RSSI) value for one or more first APs associated with the first country code;
determining an average RSSI value for one or more second APs associated with the second country code;
selecting the first country code as a most popular country code when the average RSSI value of the one or more first APs is higher than the average RSSI value of the one or more second APs; and
selecting the second country code as the most popular country code when the average RSSI value of the one or more second APs is higher than the average RSSI value of the one or more first APs.

10. A non-transitory computer-readable storage medium storing one or more programs containing instructions that, when executed by one or more processors of a wireless station (STA), cause the STA to perform operations comprising:
receiving a plurality of frames from a number of access points (APs), each frame including a country code indicating a country in which the corresponding AP is located;
determining a popularity of each country code by polling the received country codes;
determining in which country the STA is currently located based, at least in part, on the determined popularities of the country codes; and
selecting a wireless channel and a transmit power level based, at least in part, on the determined country.

11. The non-transitory computer-readable storage medium of claim 10, wherein execution of the instructions cause the STA to perform operations further comprising:
qualifying each of the received country codes for the popularity determination.

12. The non-transitory computer-readable storage medium of claim 11, wherein execution of the instructions causes the STA to perform operations further comprising:
for a respective country code,
incrementing a count value for the respective country code each time a frame containing the respective country code is received and qualifies for the popularity determination; and
ignoring the respective country code when the respective country code does not qualify for the popularity determination.

13. The non-transitory computer-readable storage medium of claim 11, wherein execution of the instructions for qualifying causes the STA, for each of the received country codes, to:
determine a received signal strength indicator (RSSI) value for a corresponding AP;
qualify the received country code when the RSSI value is greater than a threshold level; and
disqualify the received country code when the RSSI value is not greater than the threshold level.

14. The non-transitory computer-readable storage medium of claim 11, wherein execution of the instructions for qualifying causes the STA, for each of the received country codes, to:
compare the country code received from a corresponding AP with one or more country codes previously received from the same AP;
qualify the received country code when the comparing results in a match; and
disqualify the received country code when the comparing results in a mismatch.

15. The non-transitory computer-readable storage medium of claim 11, wherein execution of the instructions for qualifying causes the STA, for each of the received country codes, to:
compare a list of authorized channels received from a corresponding AP with known authorized channels for the country indicated by the received country code;
qualify the received country code when the comparing results in a match; and
disqualify the received country code when the comparing results in a mismatch.

16. The non-transitory computer-readable storage medium of claim 10, wherein execution of the instructions causes the STA to perform operations further comprising:
determining when a first country code and a second country code have the same determined popularity;
determining an average received signal strength indicator (RSSI) value for one or more first APs associated with the first country code;
determining an average RSSI value for one or more second APs associated with the second country code;
selecting the first country code as a most popular country code when the average RSSI value of the one or more first APs is higher than the average RSSI value of the one or more second APs; and
selecting the second country code as the most popular country code when the average RSSI value of the one or more second APs is higher than the average RSSI value of the one or more first APs.

17. A wireless station (STA) to determine transmission characteristics, the STA comprising:
a transceiver to receive frames from a number of access points (APs), each frame including a country code indicating a country in which the corresponding AP is located;
one or more processors; and
a non-volatile memory storing instructions that, when executed by the one or more processors, cause the STA to:
determine a popularity of each country code by polling the received country codes;
determine in which country the STA is currently located based, at least in part, on the determined popularities of the country codes; and
select a wireless channel and a transmit power level based, at least in part, on the determined country.

18. The wireless station of claim 17, wherein execution of the instructions causes the STA to:
qualify each of the received country codes for the popularity determination.

19. The wireless station of claim 18, wherein execution of the instructions causes the STA to:
for a respective country code,
increment a count value for the respective country code each time a frame containing the respective country code is received and qualifies for the popularity determination; and
ignore the respective country code when the respective country code does not qualify for the popularity determination.

20. The wireless station of claim 18, wherein execution of the instructions to qualify each of the received country codes causes the STA to:
determine a received signal strength indicator (RSSI) value for a corresponding AP;
qualify the received country code when the RSSI value is greater than a threshold level; and disqualify the received country code when the RSSI value is not greater than the threshold level.

21. The wireless station of claim 18, wherein execution of the instructions to qualify each of the received country codes causes the STA to:
- compare the country code received from a corresponding AP with one or more country codes previously received from the same AP;
- qualify the received country code when the comparing results in a match; and
- disqualify the received country code when the comparing results in a mismatch.

22. The wireless station of claim 18, wherein execution of the instructions to qualify each of the received country codes causes the STA to:
- compare a list of authorized channels received from a corresponding AP with known authorized channels for the country indicated by the received country code;
- qualify the received country code when the comparing results in a match; and
- disqualify the received country code when the comparing results in a mismatch.

23. The wireless station of claim 17, wherein execution of the instructions causes the STA to further:
- determine when a first country code and a second country code have the same determined popularity;
- determine an average received signal strength indicator (RSSI) value for a first group of APs associated with the first country code;
- determine an average RSSI value for a second group of APs associated with the second country code;
- select the first country code as a most popular country code when the average RSSI value of the first group of APs is higher than the average RSSI value of the second group of APs; and
- select the second country code as the most popular country code when the average RSSI value of the second group of APs is higher than the average RSSI value of the first group of APs.

\* \* \* \* \*